United States Patent [19]
Herron

[11] 3,895,236
[45] July 15, 1975

[54] ENERGY CONVERSION APPARATUS
[75] Inventor: Robert C. Herron, New York, N.Y.
[73] Assignee: RCH Energy Corporation, New York, N.Y.
[22] Filed: Aug. 9, 1973
[21] Appl. No.: 387,001

[52] U.S. Cl. .................. 290/55; 290/44; 416/9; 416/68
[51] Int. Cl. .................................. F03d 9/00
[58] Field of Search ............ 290/42, 43, 53, 54, 55; 417/330, 331, 332, 333, 334; 416/64–68, 9, 10

[56] References Cited
UNITED STATES PATENTS

| | | | |
|---|---|---|---|
| 1,077,509 | 11/1913 | Benis | 417/330 |
| 1,439,984 | 12/1922 | Talbert | 417/330 |
| 1,864,499 | 6/1932 | Grigsby | 290/42 X |
| 2,748,717 | 6/1956 | Davis | 417/334 |
| 3,064,137 | 11/1962 | Corbett et al. | 290/55 |
| 3,151,564 | 10/1964 | Rosenberg | 417/330 |
| 3,487,228 | 12/1969 | Kriegel | 290/53 |
| 3,546,473 | 12/1970 | Rich | 290/42 |
| 3,567,953 | 2/1971 | Lord | 290/42 |
| 3,740,565 | 6/1973 | Wesley | 290/55 |

Primary Examiner—G. R. Simmons
Attorney, Agent, or Firm—Kenyon & Kenyon Reilly Carr & Chapin

[57] ABSTRACT

An energy conversion apparatus for converting forces occuring in nature to electrical energy. Natural forces such as wind, gravity, etc. are converted to reciprocating linear motion which is then converted to electricity either directly or after a linear to rotary motion conversion.

9 Claims, 14 Drawing Figures

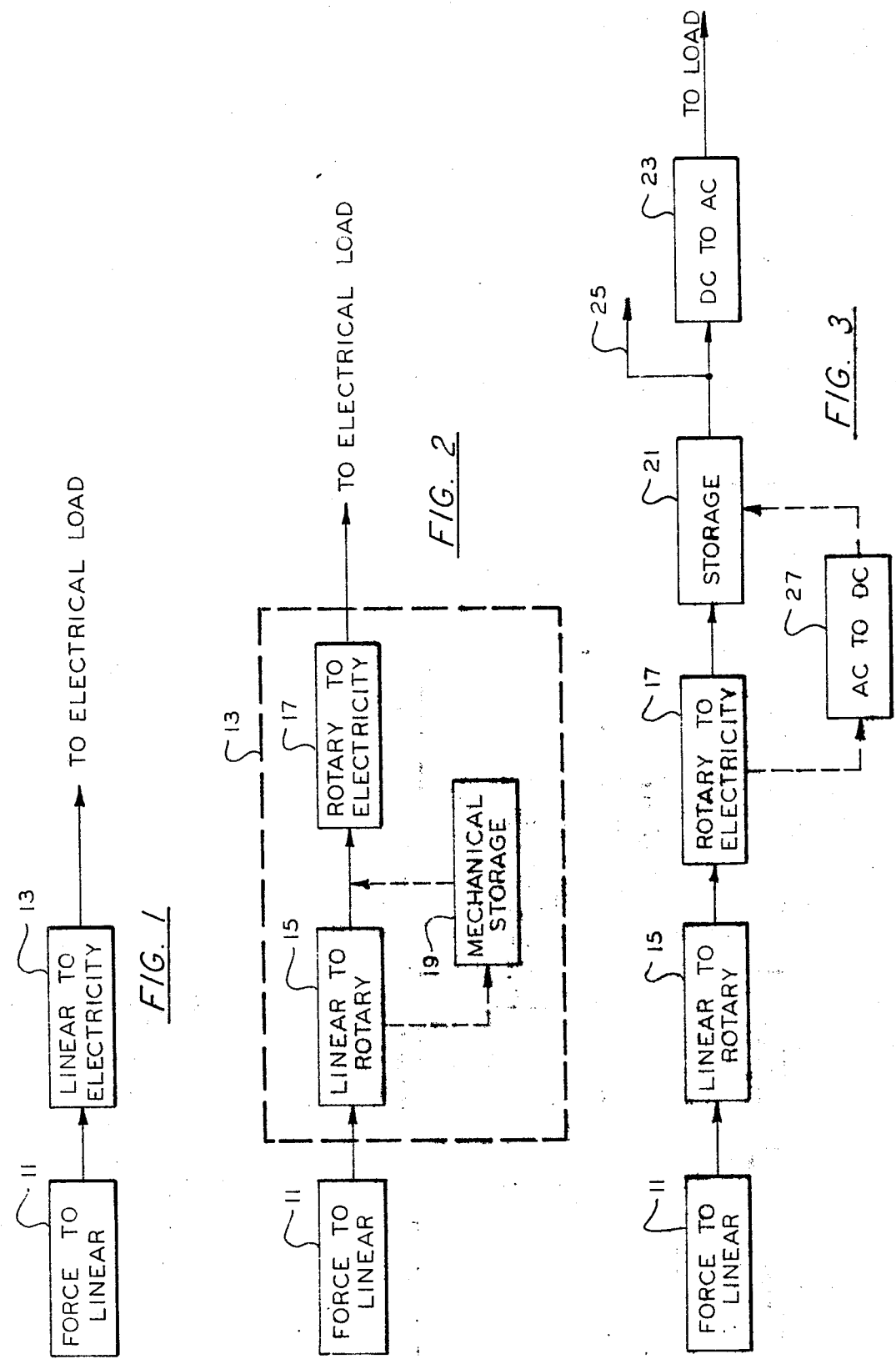

PATENTED JUL 15 1975 3,895,236

SHEET 2

ENERGY CONVERSION APPARATUS

BACKGROUND OF THE INVENTION

This invention relates to energy conversion in general and more particularly to an improved system for converting preexisting natural forces into electrical energy.

It has been well established that an energy crisis exists in the world at present. The demand for energy, and particularly electrical energy has increased materially and continues to increase. Supplies of fossil fuel are dwindling and cannot be depended upon to supply all energy requirements. Although atomic energy has offered a partial solution to the energy crisis its environmental problems have delayed its development. Even with the availability of sufficient fossil fuels, the pollution caused by such fuels is still a serious problem. A great deal of effort is being expended by environmentalist to prevent the construction of additional generating facilities which would add to water, air and thermal pollution. The availability of forces in nature as a possible source of energy has been recognized. The use of wind, waves, and sun as energy sources has been considered. However, as of yet, no practical manner of harnessing these sources has been proposed. Obviously if such forces which preexist in nature can be used, their advantages over conventional types of energy generation become numerous. They allow generating additional energy at low cost without increasing pollution. Thus there is a need for a practical method for harnessing such energy.

SUMMARY OF THE INVENTION

The present invention provides apparatus for harnessing such preexisting forces to supply electrical energy. The generating devices of the present invention can effectively aid in supplying the additional electrical requirements in conjunction with present facilities. The generating devices of the present invention may be used as residential generators to permit a home owner to reduce the amount of electircity he must buy and may also be constructed in large sizes to provide additional generating capability for larger installations and may even be used as generating stations by power companies.

Basically the system of the present invention takes a force such as wind or waves or similar type of force to be described below which is generally cyclic or periodic and converts it to a linear motion. The linear motion is then in some cases used directly to generate electrical energy through the use of a linear generator or is first converted to rotary motion for that purpose. Various embodiments are shown in which the electricity may be stored and converted from DC to AC. Various specific embodiments are illustrated, in particular, an embodiment in which wind forces are used to obtain the linear motion is shown. In this embodiment a specially designed sail having a plurality of flaps adapted to open at various wind velocities is secured to a shaft which is mounted for linear motion and is forced inward by the wind and returned by a spring. The device relies on the fact that generally some variation in wind will be experienced and also makes use of the flaps included therein which will alternatingly open and close to cause the sail and its shaft to reciprocate in and out. Another embodiment employs a hydraulic system located under a road or possibly under a sidewalk or the like in which the gravitational forces of automobiles or people passing over the hydraulic section generate the force to move a shaft on the end of a piston. Obviously, on heavily traveled roads or sidewalks such a device will generate a continuous supply of electricity.

Various means of converting linear motion to rotational motion are shown as are various output arrangements.

BRIEF DESCRIPTION OF THE DRAWINGS

FIG. 1 is block diagram illustrating the system of the present invention in its simplest form.

FIG. 2 is a similar block diagram illustrating a system in which linear to rotary conversion is provided.

FIG. 3 is a block diagram illustrating aa generalized system having means to store the generated electricity and DC to AC conversion means.

FIG. 5b is a perspective view of an embodiment similar to that shown in FIG. 5a.

FIG. 9 is a schamatic view illustrating how two generators according to the present invention can be driven by a single sail or the like.

DETAILED DESCRIPTION OF THE PREFERRED EMBODIMENTS

Figure 4:
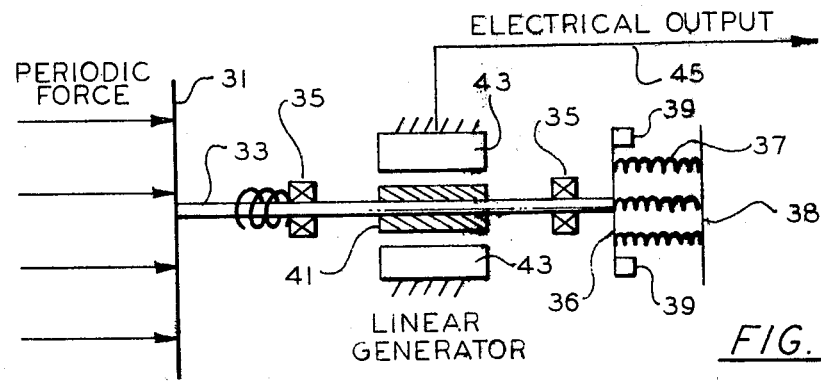
FIG. 4 is a cross-sectional schematic diagram illustrating the use of a linear motor in a device according to the present invention.

FIG. 1 illustrates in basic block diagram form the essential elements of the system of the present invention. These comprise a means 11 which is capable of converting a naturally existing force such as wind, waves, tides, etc. into reciprocating or oscillating linear motion. A second block 13 is one which comprises means capable of converting the linear motion into an electrical output. As will be described in more detail below, such means may comprise a linear motor.

FIG. 2 illustrates in block diagram form a more detailed arrangement. As in FIG. 1, means to convert a natural force into periodic linear motion and designated by 11 is shown. The means of block 13 for converting the linear motion into electricity are shown as comprising a block 15 for converting the linear motion to rotary motion and a block 17 for converting the rotary motion to electrical energy. Such means will be described in detail below. The rotary to electrical energy means may comprise a conventional AC or DC generator. Also illustrated on FIG. 2 is a block 19 with dotted arrows from block 15 and to block 17. Block 19 represents a mechanical device for energy storage such as a flywheel or the like. Thus, as indicated, between the linear to rotary conversion means and the means for generating electrical energy 17, such a flywheel may be installed to smooth out the pulsating reciprocal motion obtained from the force to linear conversion means.

FIG. 3 illustrates a system which in addition to the elements described includes electrical storage means and DC to AC conversion means. Blocks 11, 15 and 17 are identical to those described above. However, the output of the electrical generating means 17 is now provided to electrical storage means 21 such as storage batteries. The output from the storage batteries is then provided to a DC to AC converter which will convert the DC output of the batteries to an AC voltage which can be used for operating conventional 115 volts 60 cycle equipment. In applications where DC is to be used directly an output 25 can be taken directly from the storage means 21. Because of the variation in speed which is inherent in the system, it may be preferable to use an AC alternator rather than a DC generator as the electrical generating means. In that case the AC output which will have a frequency which will vary with the speed must be converted to DC before being provided to the storage means. Thus, as an alternate, a block 27 is shown for this purpose. This portion of the system will be recognized as being essentially the same as that found in most modern automobiles. That is, an AC voltage is generated, rectified to obtain a DC voltage, and then stored in a storage battery. The advantages of such an arrangement particularly where speed variations occur is well known.

FIG. 4 illustrates an embodiment in which a linear generator is used. As shown on the Figure means 31 which may comprise a wind sale such as will be described below or any other means for converting existing forces into linear motion will have a periodic force applied thereto. The plate 31 is rigidly coupled to a shaft 33 supported in bearing means 35 in conventional fashion. The other end of the shaft is shown as having a plate rigidly coupled thereto which is spring biased against the direction of the force by one or more springs 37 which are placed between the plate 36 and a rigid structure 38. Mounted to the shaft 33 for movement therewith is the rotor 41 of a linear generator. The rotor 41 will cooperate with stator portions 43 in conventional fashion to provide an electrical output on line 45. This electrical output may then be used in the manner described above in connection with FIG. 3. In operation the periodic force will push in on the plate 31 moving the shaft 33 therewith causing electricity to be generated in the linear generator. Because of the periodic nature of the force or because of the design of the plate 31 in the case of the wind sail to be described below the plate will thereafter under the force of springs 37 return to its initial position again generating electrical energy. Force will be applied to the plate pushing it in. Such reciprocation will continue as long as the forces are present causing an output of electricity to be continually generated.

Figure 5A:
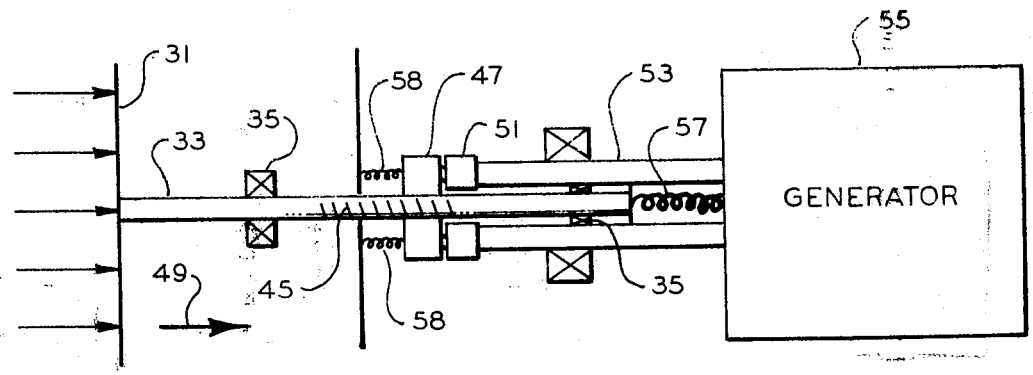
FIG. 5a is a similar diagram illustrating a system in which the linear motion is converted to rotary motion to drive a conventional generator.

FIG. 5a illustrates an embodiment in which the linear motion is first converted into rotary motion. As in the embodiment of FIG. 4 the shaft 33 is coupled to the plate 31 and is supported in suitable bearing means 35. The end of the shaft away from the plate 31 will be threaded as a worm gear or in some cases may simply be a twisted rod, twisted in the nature of the rod associated with a top. This is indicated by the threaded portion 45 on the drawing. The threads 45 will engage surface threads in a member 47. Member 47 is not rotationally restrained in any manner. On its rear edge it will contain clutch or ratchet means adapted to engage only when the member 47 is being turned by linear motion in the direction of arrow 49. Member 47 thus selectively engages the end 51 of the shaft 53 of a generator 55. As shown, the generator shaft is at least partially hollow to accept the end of shaft 33. The second bearing 35 is within shaft 53. Alternatively, through proper machining, the shaft 53 can act as the second bearing surface for the shaft 33. A spring 57 is provided between the end of shaft 33 and a fixed portion in shaft 53 to provide the restoring force to shaft and the plate 31. The generator 55 may have its rotor act as the flywheel to smooth out motion. Alternately an additional flywheel as indicated by FIG. 2 may be installed. During outward motion under the force of spring 57 the members 47 and 51 will disengage allowing shaft 53 to free-wheel. Springs 58 are provided to cause member 47 to be slightly biased towards member 51 so that they will immediately engage when the force in the direction of arrow 49 is applied.

Figure 5B:
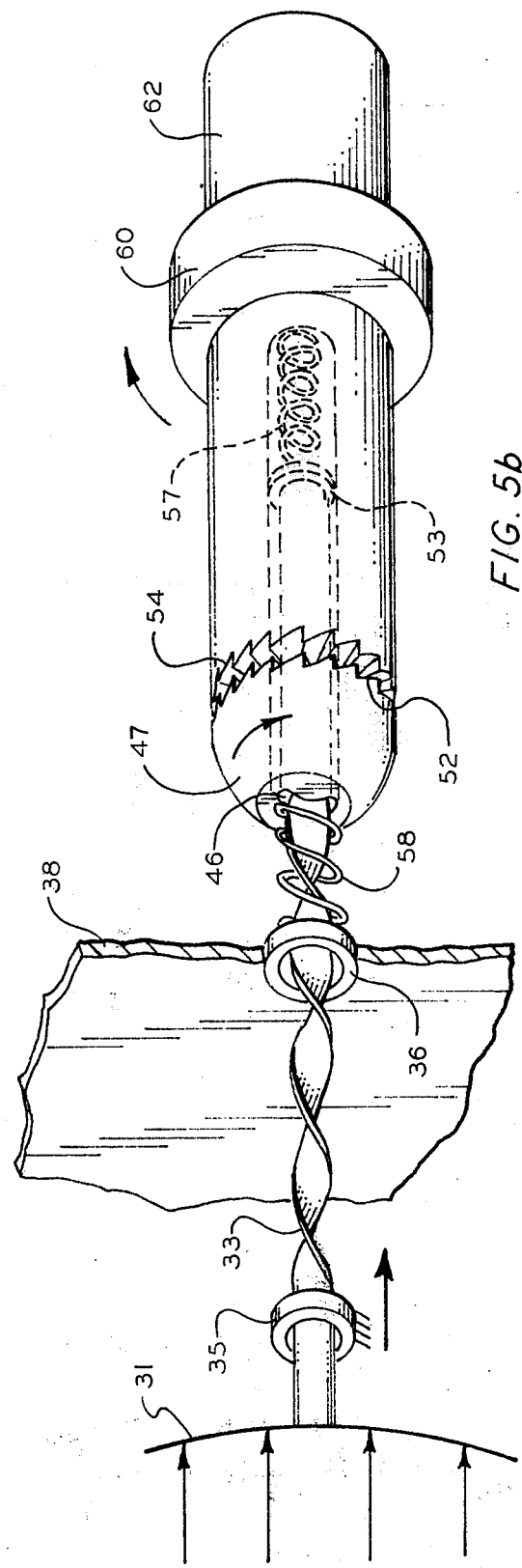

FIG. 5b illustrates a perspective view of an embodiment according to FIG. 5a. A sail 31 such as those to be described below is attached to the end of a shaft 33 which shaft comprises a twisted rod, twisted much in the manner of the rod associated with a spinning top. The rod 33 is supported by a bearing 35 along with a bearing 36 in the housing 38 of the generating equipment. The shaft 33 engages a member 47 which contains a slot 46 which is shaped to mate with shaft or rod 33. Linear motion of the shaft 33 will thus result in rotation of member 47. The inside end of member 47 is made with jagged projections 52 all of which point in one direction. These engage similar projections 54 on the end of a shaft 53 coupled to a flywheel 60, the output shaft 62 of which may then be used to drive the generator of FIG. 5a. The orientation of the projections 52 and 54 result in coupling only on the inward stroke. In addition they prevent transmittal of force from the flywheel 60 to the shaft 33 should the flywheel speed exceed the shaft rotational speed. Shaft 53 is hollow to accept the end of the shaft 33 and contains a spring 57 therein which is adapted to press against the end of the shaft 33 and bias it outwards. As described above, a spring 58 is provided to insure that engagement of member 47 and shaft 53 occurs immediately upon the inward motion of shaft 33. Operation is as described above in connection with FIG. 5a.

Figure 6A:
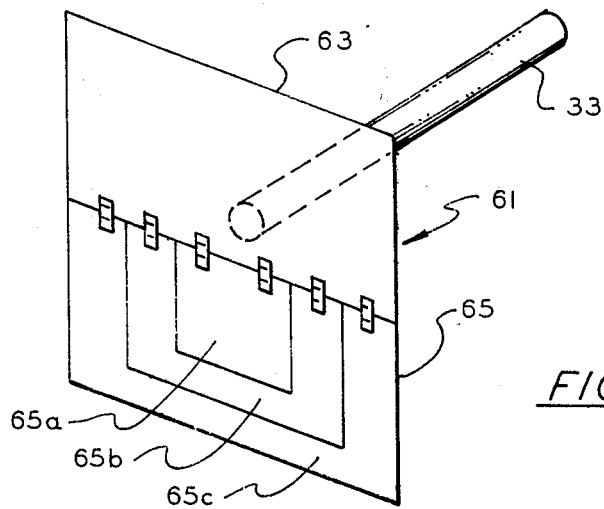
FIG. 6a is a perspective view of a first embodiment of a wind sail which may be used as the energy input device for the systems illustrated on the previous Figures.

FIG. 6a illustrates a typical embodiment of a plate 31 such as may be used for converting wind forces into linear motion. The plate generally designated as 61 and to which the shaft 33 is rigidly coupled comprises a solid upper section 63 having the shaft 33 coupled thereto with a plurality of hinged flaps 65 on its lower section. The flaps will be of different size and weight and may have additional weights placed thereon. The flap 65a, for example will be weighted so that it will open under a wind velocity of 5 knots; the flap 65b weighted to open at 10 knots and the flap 65c to open at, for example, 15 knots. In operation, with a variable wind blowing, the wind will alternately push the plate 63 inward where its linear motion will be converted as described above. If the wind is blowing in short bursts the absence of wind will permit the shaft 33 and plate 63 to return to under the force of the spring described above in preparation for another blast of wind. However, even if the wind is blowing somewhat steadily a reciprocating motion will occur because of the flaps 65. While moving inwardly the differential pressure, because of the movement, will not be great enough to open all the flaps associated with the particular existing wind velocity. However when the shaft 33 reaches the end of its travel, the wind force will open one or more of the flaps. This will cause the pressures to become unequal and the spring force will tend to return the shaft 33 to its initial position. At some point in its travel the flaps will return to the closed position and the force of the wind will again tend to push the shaft in. The flap action and the amount of reciprocating travel will vary for various wind speeds. However, under all normal conditions, sufficient reciprocation will take place to generate energy as required. Systems can be designated with different types of flaps dependings on the prevailing wind conditions at the location where they are to be used. Also in this regard the pitch of the threads 45 shown on FIG. 5a may also be varied so as to take into account the expected force which will be applied to the input plate 31. That is, if only small forces are to be expected, a long pitch which will require only a small force to rotate the member 47 may be used. On the other hand, if strong wind forces are expected the pitch can be shortened so as to require more force to turn the member 47. Naturally, in the latter embodiment a greater amount of electrical energy will be obtained for the same degree of motion of the shaft 33.

Figure 6B:
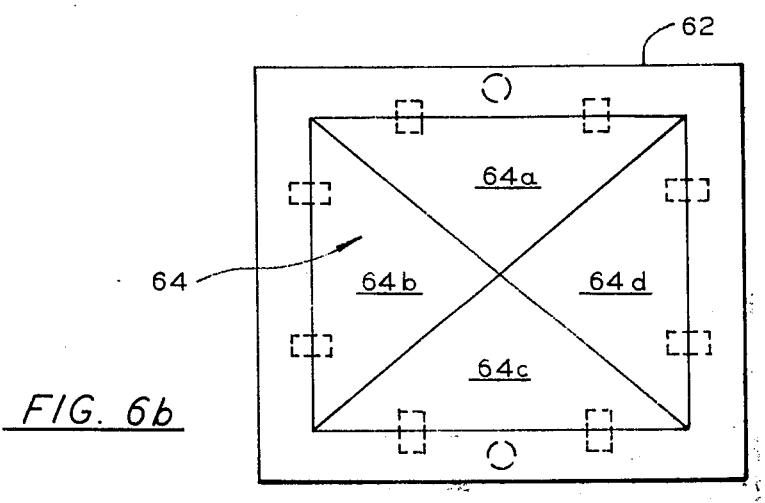
FIG. 6b is a perspective view of a second embodiment of a wind sail.

FIG. 6b illustrates a different type of sail arrangement. Operation is similar to that described above. The main difference is in the types of flaps that are used. In this embodiment the sail is made of a frame 62 having a plurality of triangular hinged sections 64 hinged to the inside of the sides of the frame 62. Each of the hinged panels will be weighted or spring loaded to open at a different wind force. Spring loading may be done using conventional springs or preferably through the use of plastic stiffeners coupling the frame and panels. Various thicknesses of stiffeners may be selected to obtain different opening points. Spring loading and stiffening may also be used in the embodiment of FIG. 6a. Thus, panel 64a can be arranged to open at 5 knots, 64b at 10 knots, 64c at 15 knots and 64d at 20 knots, for example. The sail may be attached to the shaft 33 using a yoke or any other conventional mechanical means. Although only four panels are illustrated a greater or lesser number may be installed as required.

Figure 6C:
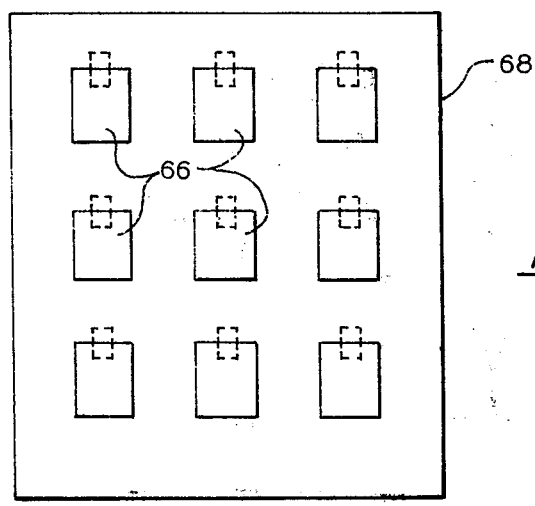
FIG. 6c is a perspective view of a third embodiment of a wind sail.

A third type of sail is shown on FIG. 6c. Here a plurality of hinged panels 66 are cut into the main portion 68 of the sail. Again each of the panels 66 may be weighted, spring loaded or stiffened to open at different wind velocities. An arrangement such as this will permit placing a large plurality of panels on the sail and thereby can result in having smaller increments between the points at which the various panels open. These three types of flapped sails are only illustrative. Other forms may equally well be used. In addition a solid said without flaps and which depends on wind variation to obtain its reciprocating motion may also be used.

Figure 7A:
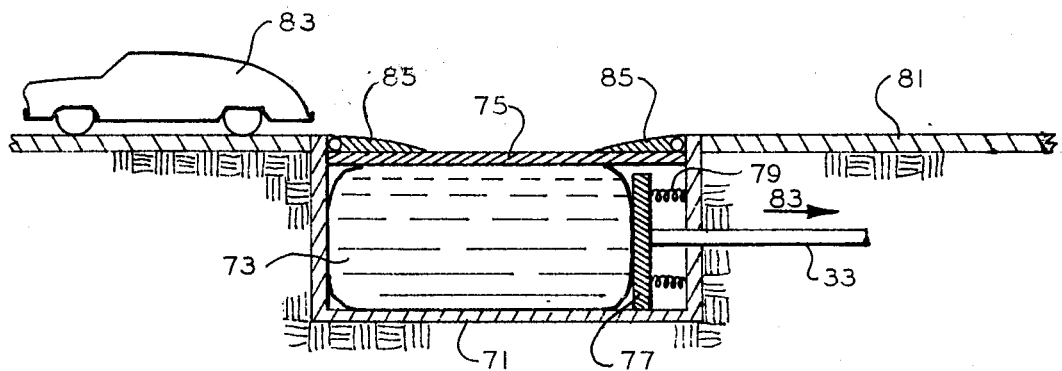
FIG. 7a is a cross-sectional view of an input system which obtains its energy from cars passing over hydraulic means installed under a road.

FIG. 7a illustrates another manner in which forces may be generated. In this embodiment a box 71 closed on five sides is placed below a section of roadbed under the ground. The box is lined for example with a heavy plastic bag 73 filled with water or some other hydraulic fluid. A top plate 75 is placed over the bag and is free to ride up and down within the box 71. Also installed is a piston 77 which is the equivalent of the plate 31 of FIGS. 4 and 5. The shaft 33 is connected to the piston 77 as described above and is led out through a suitable hole in the one side of the box 71. As shown the piston 77 may be biased by springs 79. The spring bias will tend to push the psiton against the water filled bag 73 tending to force the plate 75 up to the level of the road 81. Vehicles 83 passing over the section will by their weight force plate 75 down which, through the hydraulic fluid in the bag 73, will force the piston 77 and shaft 33 in the direction of arrow 83 to provide the linear motion described above. Suitable plates 85 will be hinged to the roadway to ease entry and exit from the plate 75. Thus a plurality of cars passing over the plate 75 in a spaced manner will press down on the plate 75 causing the type of periodic motion required in the apparatus of the present invention.

Figure 7B:
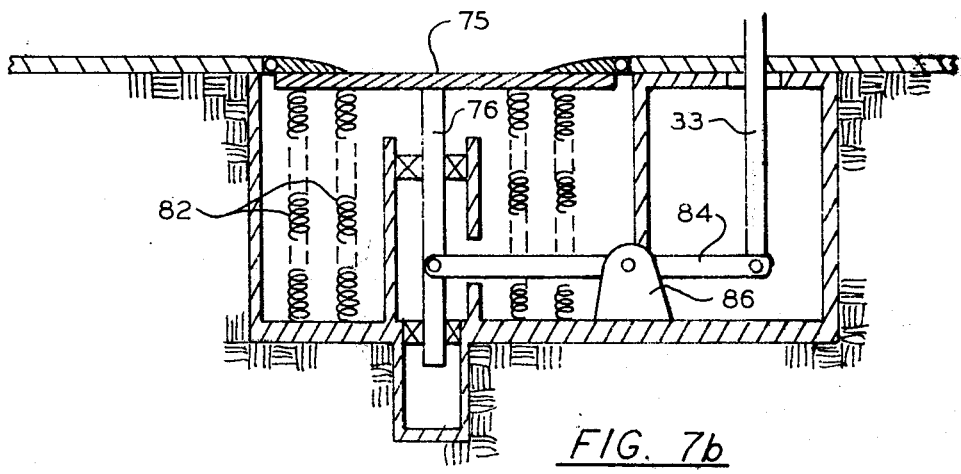
FIG. 7b illustrates a similar arrangement in which a mechanical linkage is provided between the plate on the road and the generator.

An an alternate to the arrangement of FIG. 7a, the mechanical arrangement of FIG. 7b may be used. In this arrangement, the plate 75 is attached to a shaft 76 mounted for up and down motion within a cylinder 78 containing conventional bearing means 80. Suitable springs 82 will be provided to bias the plate 75 upward to be level with the roadway, against which spring force the weight of vehicles or people passing over the plate 75 will act to move shaft 76 downward. Shaft 76 is linked to the shaft 33 by a linkage bar 84 mounted for pivotal motion in a base member 86. It is pivotally attached to the shafts 76 and 33 and causes a downward motion of the shaft 76 to result in an upward motion of shaft 33 which may then be used as described above. In each of the illustrated embodiments, use can be made of the gravitational forces without taking up an excess amount of space under the roadbed. If space is no problem the shaft 76 directly may be used as the input shaft 33 shown on FIGS. 4 and 5 and the mechanical linkages eliminated.

Figure 8:
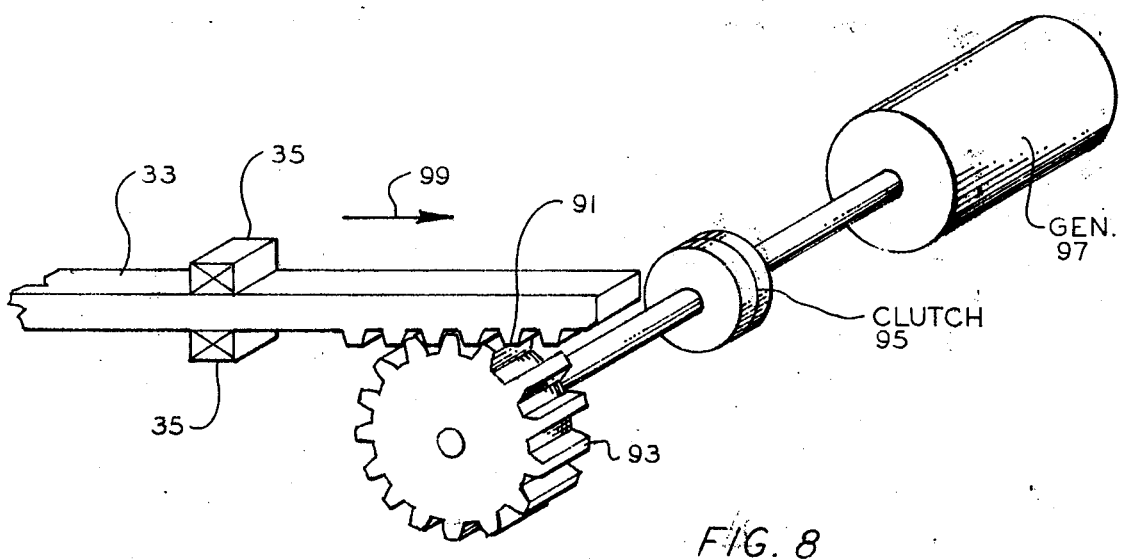
FIG. 8 illustrates another embodiment for converting linear to rotary motion.

FIG. 8 illustrates an alternate embodiment for converting linear to rotary motion. As shown thereon, the shaft 33 supported by bearings 35 will have formed on its end a rack gear 91 which engages a pinion gear 93 connected through a clutch 95 to a generator 97. As in the embodiment of FIG. 5, the clutch will be adapted to engage only when the shaft 33 is moving in the direction of arrow 99. Also as described above a flywheel may be included between the clutch 95 and generator 97.

Figure 9:
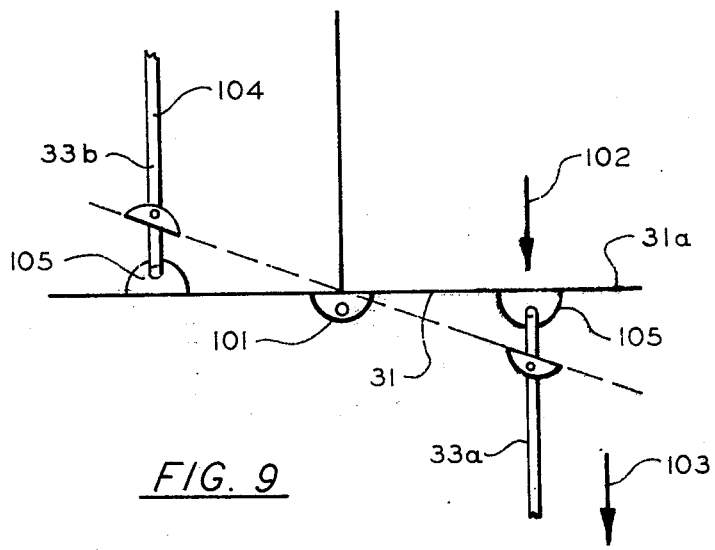

FIG. 9 illustrates the manner in which two shafts 33a and 33b may be driven by a single plate 31. In this embodiment the plate is mounted for pivotal motion about a point 101 which may comprise a shaft about which the plate 31 is supported in conventional bearings for rotation. Only the side of 31a of the plate is exposed to the wind or other force. The shafts 33a and 33b are coupled to the plate 31 through suitable flexible couplings 105. Thus motion of the plate in the direction of arrow 101 will result in motion of shaft 33a in the direction of arrow 103 and shaft 33b in the direction of arrow 104. Each of these linear motions of the shafts 33a and 33b may then be converted in the manner described above.

Figure 10:
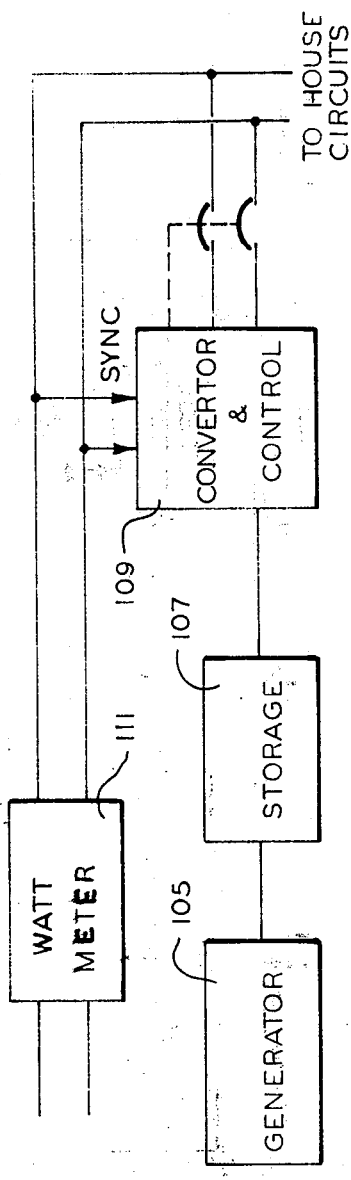
FIG. 10 is a block diagram illustrating how a system according to the present invention may be integrated into the electrical system of a typical home.

FIG. 10 illustrates a typical arrangement for the household use of a generator according to the present invention. A generator 105 such as those described above is placed where it may obtain the forces required for its operation. The generator output which will either be DC or be converted to DC is provided to a plurality of storage batteries 107. Since the system is for use in suplementing house current a sufficient number of storage batteries to provide the necessary peak voltage corresponding to the voltage level supplied by the local power company will be provided. The storage means 107 are coupled to a converter and control means 109. Such DC to AC converters are will known and may comprise for example a plurality of semiconductor devices such as thyristors or the like. The firing of these devices can be controlled by inputs from the house current being supplied from the power company through a watt meter 111. In this manner the AC voltage supplied by the converter will be synchronized with the voltage being supplied by the power company. In well known fashion the voltage output of the converter will be controlled to be slightly higher than the voltage being supplied by the power company so that the current first to be used will be that being generated by generator 105. Conventional control means can be included to assure that the average amount of power being used does not exceed that being generated. Excess demand by the house circuits is made up by incoming power from the power company. Such household installation can result in materially reduced electricity bills for the home owner while at the same time helping to alleviate the energy crisis and the pollution associated with generation of electricity. To do this the system of the present invention requires only naturally existing forces and in no way increases atmospheric or water pollution. In similar manner one or more of a plurality of generators 105 may be used to supply larger installations and may also be used as generating devices by power companies which devices are then integrated with other conventional generating devices such as device 105 will result in a more even power output under these circumstances. In addition systems in which the gerneating forces comprise a combination of natrual forces generated according to the present invention along with conventional forces may be used. For example a device according to the present invention could be coupled to the shaft of a conventional steam turbine with steam being used to make up for any excess energy required to maintain the generator output. Thus, only for incremental amounts of power would steam generated by conventional fossil or atomic fuels be required. With such an arrangement a material reduction of energy use and pollution still results.

Only a few possible input sources have been described herein, i.e., wind and various gravitational inputs. Many other sources of power are available. For example, wave and tides may be used. In addition the movement of a swing or a rocking chair or the like may be used to obtain the linear motion required. These and other modifications may be made without departing from the spirit of the invention which is intended to be limited solely by the appended claims.

What is claimed is:

1. Apparatus for developing electrical energy from a periodic natural force comprising:
   a. a shaft supported for linear motion;
   b. a sail rigidly coupled with one end of said shaft, said sail having a plurality of flaps arranged therein, each of said flaps being preloaded so as to open at a different wind velocity;
   c. means to bias said shaft in a direction essentially perpendicular to said sail; and
   d. means for converting the linear motion of said shaft into electricity.

2. The invention according to claim 1 wherein said means for converting linear motion comprises a linear generator.

3. The invention according to claim 1 wherein said means for converting linear motion comprises:
   a. means to convert reciprocating linear motion to rotary motion; and
   b. a rotating electrical generator 4. The invention according to claim 3 and further including DC electrical storage means coupled to the output of said generator.

5. The invention according to claim 4 and further including DC to AC conversion to the output of said storage means.

6. The invention according to claim 4 wherein said generator is an AC generator and further including rectifier means interposed between said generator and said storage means.

7. Apparatus for converting wind forces to electrical energy comprising:
   a. a sail;
   b. a shaft supported for linear motion rigidly coupled to said sail, said shaft containing a thread thereon;
   c. means to bias said shaft essentially perpendicular to said sail;
   d. a member having a matching thread placed on said shaft and restrained for limited motion;
   e. means for generating electricity; and
   f. means coupling said member to said generating means in a uni-directional manner.

8. The invention according to claim 7 wherein said means for generating electricity comprises an electrical generator including a rotor supported on a rotor shaft coaxial with the linear shaft, said rotor shaft mating with said member and having a hollow portion into which the end of said linear shaft extends and wherein said biasing means comprises at least one spring inside said hollow portion acting against the end of said linear shaft.

9. Apparatus according to claim 8 and further including a plurality of flaps formed in said sail and preloaded so as to open at different wind velocities.

* * * * *